United States Patent
Tokita et al.

(10) Patent No.: US 6,458,897 B1
(45) Date of Patent: Oct. 1, 2002

(54) AQUEOUS DISPERSION COMPOSITION PROCESS FOR PREPARING THE SAME, RUST PREVENTIVE, RUST PREVENTION METHOD, AND RUST-PROOFED METALLIC PRODUCTS

(75) Inventors: Suguru Tokita; Shigenobu Otsubo, both of Yamaguchi; Yoshiyuki Harada; Makoto Nakazawa, both of Chiba, all of (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/242,566

(22) PCT Filed: Jun. 19, 1998

(86) PCT No.: PCT/JP98/02734

§ 371 (c)(1),
(2), (4) Date: Feb. 19, 1999

(87) PCT Pub. No.: WO98/59003

PCT Pub. Date: Dec. 30, 1998

(30) Foreign Application Priority Data

Jun. 20, 1997 (JP) ............................................. 9-164262
Jun. 20, 1997 (JP) ............................................. 9-164263

(51) Int. Cl.[7] ........................... C08L 63/00; B05D 1/02; B05D 1/18
(52) U.S. Cl. ....................... 525/438; 525/423; 525/425; 525/430; 427/421; 427/428; 427/429; 427/435
(58) Field of Search ................................. 525/425, 423, 525/430, 438; 427/421, 428, 429, 430.1, 435

(56) References Cited

U.S. PATENT DOCUMENTS

| 4,818,783 A | * | 4/1989 | Shioji et al. ................. 524/425 |
| 5,846,660 A | * | 12/1998 | Sasaki et al. |
| 6,124,401 A | * | 9/2000 | Hart et al. |

FOREIGN PATENT DOCUMENTS

| JP | 6428215 | 1/1989 |
| JP | 7508552 | 9/1995 |
| JP | 8231791 | 9/1996 |
| JP | 8319429 | 12/1996 |
| JP | 931274 | 2/1997 |
| JP | 9187884 | 7/1997 |

* cited by examiner

*Primary Examiner*—Deborah Jones
*Assistant Examiner*—Jennifer McNeil
(74) *Attorney, Agent, or Firm*—Birch, Stewart, Kolasch & Birch, LLP

(57) ABSTRACT

An aqueous dispersion composition which comprises an ionomer resin (A) neutralized with a divalent metal, and water, sufficiently answers high level of requirement performances in various uses, and in particular, is particularly suitable as a heat sealing agent for aluminum foil, film, paper or the like, a metal coating agent, a modifier for various emulsions, a paint, an adhesive, a rust-preventive treating agent, and the like; a method which can produce the aqueous dispersion composition in high yield; a rust-preventive treating agent for a metal surface, which contains the aqueous dispersion composition, has excellent corrosion resistance, and can form a rust-preventive layer showing excellent coating adhesion to a over coat paint; a rust-preventive treatment method using the rust-preventive treating agent; and a rust-preventive treated metal product.

7 Claims, No Drawings

AQUEOUS DISPERSION COMPOSITION PROCESS FOR PREPARING THE SAME, RUST PREVENTIVE, RUST PREVENTION METHOD, AND RUST-PROOFED METALLIC PRODUCTS

This application is the national phase under 35 U.S.C. §371 of prior PCT International Application No. PCT/JP98/02734 which has an International filing date of Jun. 19, 1998 which designated the United States of America.

FIELD OF THE INVENTION

The present invention relates to an aqueous dispersion composition and a process for producing the same, and rust-preventive agent, a rust-preventive treatment method and a rust-preventive treated metal product.

BACKGROUND ART

It is well known that an ionomer resin comprising a macromolecular main chain mainly constituted of a hydrocarbon, which is a partially neutralized product obtained by a part of carboxyl groups present on the side chain wish a metal cation has good adhesion to various substrates, in particular, metals. Further, it is known that since this ionomer resin can easily be dispersed in water, it is used as an aqueous dispersion. For this reason, an aqueous dispersion containing an ionomer resin has conventionally been used as a heat sealing agent for an aluminum foil, a film or a paper, a metal coating agent, a modifier for various emulsions, a paint, an adhesive, a rust-preventive treating agent, and the like.

However, in recent years, various properties are required for a coating formed from an ionomer resin. When the conventional ionomer resin is used as an aqueous dispersion, there is the case that the coating cannot cope with such a diversity.

By the way, in recent years, based on the rise in environmental problems, there is a trend that a chromate treatment (treatment with hexavalent chromate or the like) which has conventionally been applied to a rust-preventive steel plate is omitted. The coating itself formed by this chromate treatment has high degree of corrosion resistance and painting adhesion, and reinforces the function of a rust-preventive layer. Therefore, if this chromate treatment is not conducted, it is presumed that the corrosion resistance and painting adhesion of the rust-preventive steel plate markedly decrease. For this reason, the rust-preventive treating agent used in rust-preventive treated metal plates has come to be required to form a rust-preventive layer having higher degree of corrosion resistance and painting adhesion than the conventional ones. A method of using an ionomer resin has conventionally been known as one of methods of forming a rust-preventive layer without conducting the chromate treatment.

However, the ionomer resin conventionally used for forming a rust-preventive layer was a neutralized product of a monovalent metal such as Na or K, $NH_3$, or an amine, and the corrosion resistance was insufficient as a rust-preventive treating agent used for forming a rust-preventive layer on a metal plate to which a chemical conversion treatment such as a phosphate treatment or a chromate treatment is not applied.

Further, an ionomer resin neutralized with a divalent metal such as Mg or Zn has conventionally been known. However, those ionomer resins have a low emulsifying property, and an aqueous dispersion cannot be obtained a good yield. Thus, those have not been used as a treating agent in an aqueous dispersion.

Further, in recent years, with diversity and sophistication on use of rust-preventive treated metal plates, for the purpose of coloration there are increased cases that a coating comprising a curable resin such as a paint is further formed on a rust-preventive treated metal plate which has conventionally been used by merely treating a base material of a substrate metal plate with a rust-preventive treating agent.

However, the ionomer resin has a poor adhesion to a coating comprising a curable resin such as a paint, and the rust-preventive layer comprising this ionomer resin does not show good painting adhesion to a coating comprising an over coat paint even if a paint or the like is coated over the coating of the ionomer resin. Thus, a rust-preventive treated metal product having excellent adhesion between the rust-preventive layer and the coating could not be obtained.

Furthermore, in recent years, high performances are required regarding compatibility, adhesion and the like to a polar compound. However, the conventional ionomer resin having carboxyl group has not met such high requirements.

DISCLOSURE OF THE INVENTION

Accordingly, a first object of the present invention is to provide an aqueous dispersion composition which sufficiently answers high requirement performances, and in particular, is suitable as a heat sealing agent for aluminum foil, film, paper or the like, a metal coating agent, a modifier for various emulsions, a paint, an adhesive, a rust-preventive treating agent, and the like.

Further, a second object of the present invention is to provide a method that can produce the aqueous dispersion composition in high yield.

Further, a third object of the present invention is to provide a rust-preventive treating agent for a metal surface, which contains the above-mentioned aqueous dispersion composition, has excellent corrosion resistance, and can form a rust-preventive layer showing excellent adhesion to an over coat paint when the over coat paint is further coated on an upper layer.

Furthermore, a fourth object of the present invention is to provide a rust-preventive treatment method which forms a rust-preventive layer having excellent corrosion resistance and showing excellent adhesion to an over coat paint when the over coat paint is coated on an upper layer, on the surface of a metal product using the above-mentioned rust-preventive treating agent.

Further, a fifth object of the present invention is to provide a rust-preventive treated metal product having formed thereon a rust-preventive layer having excellent corrosion resistance and showing excellent adhesion to an over coat paint when the over coat paint is coated on an upper layer.

To attain the first object, the present invention is to provide an aqueous dispersion composition comprising an ionomer resin (A) neutralized with a divalent metal, and water.

Further, to attain the second object, the present invention is to provide a process for producing an aqueous dispersion composition including the steps of mixing an ionomer resin (A) neutralized with a divalent metal, and a monovalent alkali metal compound, and emulsifying the same.

Further, to attain the third object, the present invention is to provide a rust-preventive treating agent for a metal surface, comprising the above-mentioned aqueous dispersion composition.

Furthermore, to attain the fourth object, the present invention is to provide a rust-preventive treatment method which comprises coating the above-mentioned aqueous dispersion composition on a metal surface to form a rust-preventive layer.

Further, to attain the fifth object, the present invention is to provide a rust-preventive treated metal product obtained by the above-mentioned rust-preventive treatment method.

BEST MODE FOR CARRYING OUT THE INVENTION

An aqueous dispersion composition and a process for producing the same, and a rust-preventive treating agent, a rust-preventive treatment method and a rust-preventive treated metal product of the present invention are explained in detail below.

The aqueous dispersion composition of the present invention contains an aqueous dispersion comprising an ionomer resin (A), and water. The ionomer resin (A) forming this aqueous dispersion composition is a polymer comprising a polymeric main chain mainly consisting of hydrocarbon, and having carboxyl groups at side chains, wherein at least a part of the carboxyl groups is neutralized with divalent metal cations. A specific example of this ionomer resin can include an ionomer resin (A-1), which is an ethylene-unsaturated carboxylic acid copolymer, comprising a partially neutralized product obtained by neutralizing at least a part of the carboxyl groups contained is neutralized with metal cations.

The ethylene-unsaturated carboxylic acid copolymer that constitutes a main skeleton of this ionomer resin (A-1) may be a random copolymer of ethylene and unsaturated carboxylic acid or a graft copolymer in which unsaturated carboxylic acid is graft bonded to the main chain comprising polyethylene. In particular, the ethylene-unsaturated carboxylic acid random copolymer is preferable in the point that a coating having excellent transparency can be obtained. Further, this ethylene-unsaturated carboxylic acid copolymer may contain one kind of unsaturated carboxylic acid only, or two kinds or more of unsaturated carboxylic acids.

The unsaturated carboxylic acid that is the component of the ethylene-unsaturated carboxylic acid copolymer includes an unsaturated carboxylic acid having 3–8 carbon atoms or the like. Specific examples of the unsaturated carboxylic acid having 3–8 carbon atoms include acrylic acid, methacrylic acid, maleic acid, fumaric acid, itaconic acid, crotonic acid, isocrotonic acid, citraconic acid, allylsuccinic acid, mesaconic acid, glutaconic acid, nadic acid, methylnadic acid, tetrahydrophthalic acid, and methylhexahydrophthalic acid. Of those, acrylic acid and methacrylic acid are preferable from the standpoint of film-forming property.

Further, the ethylene-unsaturated carboxylic acid copolymer which constitutes the main skeleton of this ionomer resin (A-1) may contain a third component in addition to ethylene and the unsaturated carboxylic acid. This third component includes unsaturated carboxylic acid esters such as methyl (meth)acrylate, ethyl (meth)acrylate and isobutyl (meth)acrylate, and vinyl esters such as vinyl acetate.

The proportion of ethylene and the unsaturated carboxylic acid contained in the ethylene-unsaturated carboxylic acid copolymer is typically 95–60 parts by weight of ehtylene and 5–40 parts by weight of the unsaturated carboxylic acid, and preferably 92–75 parts by weight of ethylene and 8–25 parts by weight of the unsaturated carboxylic acid. Further, where the ethylene-unsaturated carboxylic acid copolymer contains a third component, it is preferable for the third component to be contained in an amount of 40% by weight or less.

In this ionomer resin (A-1), at least a part of carboxyl groups that the ethylene-unsaturated carboxylic acid copolymer has on the side chain is neutralized with divalent metal cations. The ionomer resin neutralized with monovalent metal cations is insufficient in corrosion resistance of the coating formed, and further the ionomer resin neutralized with trivalent metal cations cannot yield the aqueous dispersion at good yield. Further, the ionomer resin neutralized with $NH_3$, amine or the like in place of the monovalent metal cation can easily form an aqueous dispersion, but corrosion resistance of the coating formed is insufficient.

In the present invention, the divalent metal cation that the ionomer resin (A) has includes Mg, Zn, Ca, Cu, Fe and Ba. Of those, the ionomer resins having Mg and Zn as the divalent metal cations are preferable in the point that the production is easy.

In the ionomer resin (A-1), the proportion of carboxyl groups neutralized with divalent metal cations to all of carboxyl groups that the ethylene-unsaturated carboxylic acid copolymer has on the side chain, that is, degree of neutralization, is generally about 20–100%, and preferably 30–80%, in the point that a coating having excellent corrosion resistance is obtained. In particular, where the aqueous dispersion composition of the present invention is used as a rust-preventive treating agent, this range is effective in the point that a rust-preventive layer having excellent corrosion resistance can be formed.

Further, this ionomer resin has MFR (190° C.) by ASTM D 1238 of preferably 0.05–100 g/10 min, and particularly preferably 0.1–50 g/10 min, from the standpoint of a film-forming property after baking and drying.

The production of this ionomer resin (A-1) can be conducted according to various methods, for example, a method of copolymerizing ethylene, unsaturated carboxylic acid, and a third component used according to the need, by a high pressure radical polymerization method, and neutralizing carboxyl groups of the ethylene-unsaturated carboxylic acid copolymer obtained with a compound having the divalent metal cations; or a method of graft polymerizing unsaturated carboxylic acid onto polyethylene, and neutralizing carboxyl groups of the graft copolymer obtained with a compound having the divalent metal cations. Further, this production may be conducted by supplying predetermined components into an extruder and melt kneading to conduct reaction, or may be conducted in water or an appropriate organic solvent.

The compound having the divalent metal cations includes ZnO, $Zn(OH)_2$, MgO, $Mg(OH)_2$, CuO, $Ca(OH)_2$, and $Ba(OH)_2$.

The aqueous dispersion composition of the present invention comprises an aqueous dispersion of the ionomer resin (A) as a main component, and may contain at least one kind selected from an epoxy group-containing compound (B) and a reaction product (C) of the ionomer resin (A) neutralized with the divalent metal cations and the epoxy group-containing compound (B). That is, the aqueous dispersion composition of the present invention may be any composition comprising the combinations of each components in the following four aspects.

(1) Ionomer resin (A) alone (2) Ionomer resin (A)+epoxy group-containing compound (B)

(3) Ionomer resin (A)+epoxy group-containing compound (B)+reaction product (C)

(4) Ionomer resin (A)+reaction product (C)

Of those, the compositions comprising the combinations of the above (2)–(4) are effective in that a coating having excellent adhesion to a coating comprising a curable resin or the like formed on an upper layer can be formed. This aqueous dispersion composition is appropriately selected according to formation or no formation of a coating on an upper layer, a film-forming component used, film-forming conditions (treatment conditions of, for example, baking the aqueous dispersion composition or the film-forming component), and the like.

Where the aqueous dispersion composition of the present invention is used as the main component of a rust-preventive treating agent, the composition comprising the above-mentioned combinations of (2)–(4) are effective in that a rust-preventive layer having excellent adhesion to a coating comprising a curable resin such as a over coat paint can be formed. In the rust-preventive treating agent, the combinations of (2)–(4) are appropriately selected according to necessity or unnecessity of a over coating, a paint used, film-forming conditions (baking conditions of the rust-preventive treating agent or the over coat paint), and the like.

The epoxy group-containing compound (B) used as a component of the aqueous dispersion composition of the present invention include glycidyl esters obtained by the reaction of carboxylic acid and 2,3-epoxypropanol or the like; and alycidyl ethers obtained by the reaction of epichlorohydrin and monovalent or polyvalent metal alkoxide.

The carboxylic acids for obtaining glycidyl esters include saturated monocarboxylic acids such as acetic acid, propionic acid, butyric acid or valeric acid; saturated dicarboxylic acids such as malonic acid, succinic acid, glutaric acid or adipic acid; aromatic carboxylic acids such as benzoic acid or phthalic acid; unsaturated monocarboxylic acids such as acrylic acid or methacrylic acid; and unsaturated dicarboxylic acids such as maleic acid, fumaric acid, itaconic acid, crotonic acid, isocrotonic acid, citraconic acid, allylsuccinic acid, mesaconic acid, glutaconic acid, nadic acid, methyl-nadic acid, tetrahydrophthalic acid or methylhexahydrophthalic acid. Those carboxylic acids may be contained in glycidyl esters in one kind alone or a combination of two kinds or more.

Specific examples of the glycidyl esters used as the epoxy group-containing compound (B) include adipic acid diglycidyl ester, phthalic acid diglycidyl ester, and terephthalic acid diglycidyl ester.

Further, the monovalent or polyvalent metal alkoxide for obtaining the glycidyl ethers used as the epoxy group-containing compound (B) is a compound obtained by the reaction of monohydric or polyhydric alcohol and a metal. Examples of the monohydric alcohol include methanol, ethanol, propanol, butanol, hexanol and phenol. Examples of the polyhydric alcohol include ethylene glycol, resorcin, glycerin and bisphenol A. Examples of the metal include alkali metals or alkaline earth metals, such as lithium, sodium, potassium, magnesium and calcium.

Specific example of this monovalent or polyvalent metal alkoxide includes sodium alkoxide. One kind alone or a combination of two kinds or more of those metal alkoxides may be contained in the glycidyl ether.

Specific examples of the glycidyl ethers used as the epoxy group-containing compound (B) include sorbitol polyglycidyl ether, sorbitan polyglycidyl ether, polyglycidyl polyglycidyl ether, pentaerythritol polyglycidyl ether, diglycerol polyglycidyl ether, glycerol polyglycidyl ether, trimethylpropane polyglycidyl ether, neopentylglycol glycidyl ether, ethlene glycol diglycidyl ether, polyethylene glycol diglycidyl ether, propylene glycol diglycidyl ether, polypropylene glycol diglycidyl ether, and 2,2-bis-(4'-glycidyloxyphenyl) propane.

The aqueous dispersion composition of the present invention may contain the above-mentioned glycidyl esters and glycidyl ethers in one kind alone or a combination of tow kinds or more.

In the present invention, of those epoxy group-containing compounds (B), polyvalent epoxy compounds of diglycidyl ether such as bisphenol A diglycidyl ether, or ethylene and polyethylene glycol diglycidyl ether are preferable in the point that it can react with the ionomer resin (A) under heating to form a treating layer having excellent adhesion to a coating formed on an upper layer, and in particular, where the aqueous dispersion composition of the present invention is used as a rust-preventive treating agent, a rust-preventive layer having excellent adhesion to a curable resin layer such as a over coat paint can be formed.

Further, the epoxy group-containing compound (B) may be a modified epoxy resin compound such as a reaction product of, for example, an aromatic epoxy resin compound represented by bisphenol A type epoxy resin with a carboxyl group-containing acrylic resin or an aromatic polyol resin.

Further, in the present invention, the epoxy group-containing compound (B) is preferably a water-soluble one or one which forms a dispersion, and in particular, is preferably a water-soluble one having a water solubility of 25% or more, in the point that the preparation of the aqueous dispersion composition becomes easy. In the present invention, the water solubility means a proportion of the epoxy group-containing compound actually dissolved in water when the epoxy group-containing compound (B) is mixed with water at 25° C. That is, in the case that an insoluble content of the epoxy group-containing compound (B) remains Y g when X g of the epoxy group-containing compound (B) is dissolved in water at a certain temperature T, the water solubility of the epoxy group-containing compound (B) at the temperature T is $[(X-Y)/X] \times 100$ (%).

Further, a viscosity of the epoxy group-containing compound (E) is preferably 1–30,000 mPa·s, in particular, is preferably 5–20,000 mPa·s, at 25° C.

In the aqueous dispersion composition of the present invention, one having an epoxy equivalent in the range of generally 80–2,500, and particularly 120–2,000, is used as the epoxy group-containing compound (B). In the present invention, the epoxy equivalent means a gram number of he epoxy group-containing compound per gram equivalent of epoxy group. For example, when an epoxy group-containing compound having a molecular weight of 100 has one epoxy group in one molecule, the epoxy equivalent of this epoxy group-containing compound is 100. Further, when an epoxy group-containing compound having a molecular weight of 100 has two epoxy groups in one molecule, the epoxy equivalent of this epoxy group-containing compound is 50.

The reaction product (C) of the ionomer resin (A) and the epoxy group-containing compound (B), which is used as the component of the aqueous dispersion composition of the present invention, is formed by reacting carboxylic groups that the ionomer resin (A) has, with epoxy groups that the epoxy group-containing compound (B) has, in preparing a composition containing the ionomer resin (A) and the epoxy group-containing compound (B). This reaction product (C) is preferably a water-soluble one or one which forms a dispersion in the point that the preparation of the aqueous dispersion composition is easy.

The aqueous dispersion composition of the present invention contains the ionomer resin (A) in the form of an aqueous dispersion. Incidentally, it has conventionally been known that an ionomer resin neutralized with a monovalent metal easily forms an aqueous dispersion, but it has been known that an ionomer resin neutralized with a divalent metal has low emulsifying property, and can obtain an aqueous dispersion only in low yield.

In the process for producing the aqueous dispersion composition of the present invention, it has been found that an aqueous dispersion of the ionomer resin (A) neutralized with a divalent metal can be obtained in good yield by also using a monovalent metal compound such as K or Na at the time of the emulsification.

Examples of the monovelent metal compound used in the production process of the aqueous dispersion composition of the present invention include hydroxides such as KOH, NaOH or LiOH, and carbonates such as $K_2CO_3$ or $Na_2CO_3$. Of those, KOH and NaOH are particularly preferable.

In the production of the aqueous dispersion composition of the present invention, the monovalent alkali metal compound is generally preferably used in an amount of 0.2–1 equivalent, particularly 0.5–0.95 equivalent, relative to the carboxyl group amount in an unneutralized state of the ionomer resin (A).

In the production of the aqueous dispersion composition of the present invention, if a monovalent alkali metal compound is used, the ionomer resin (A) neutralized with a divalent metal can easily be emulsified. In general, the aqueous dispersion composition containing an aqueous dispersion of the ionomer resin (A) can easily be obtained by a method of mixing the ionomer resin (A) having a solid content of 1–60 wt % to water and a monovalent alkali metal compound, heat melting at a temperature of 100–250° C., and dispersing.

In the aqueous dispersion composition of the present invention, the proportion of the ionomer resin (A) and water is desirably adjusted such that water is 100–2,000 parts by weight, and preferably 500–1,000 parts by weight, per 100 parts by weight of the ionomer resin (A), from the point of workability in coating formation. In particular, when the aqueous dispersion composition of the present invention is used as a rust-preventive treating agent, it is desirable to adjust to this range from workability of rust-preventive treatment.

Further, the viscosity of the aqueous dispersion composition of the present invention is preferably about 30–2,000 mPa·s, and particularly about 50–1,500 mPa·s, from workability of a coating formation in forming a coating using the aqueous dispersion composition of the present invention. In particular, when the aqueous dispersion composition of the present invention is used as a rust-preventive treating agent, it is desirable to adjust to this range from the standpoint of workability of coating for forming a rust-preventive layer.

Further, a dispersion particle size of the aqueous dispersion of the ionomer resin (A) in the aqueous dispersion composition of the present invention is generally 0.1 μm or less, and preferably 0.05 μm or less.

The aqueous dispersion composition of the present invention may be composed of the above-mentioned ionomer resin (A) only, or may contain the aqueous dispersion of this ionomer resin (A), and the ionomer resin (A), the epoxy group-containing compound (B) and the reaction product (C) in any combination of the above-mentioned (2)–(4). In particular, when the aqueous dispersion composition of the present invention is used as a rust-preventive treating agent, the aqueous dispersion composition containing any combination of (2)–(4) can form a rust-preventive layer having excellent adhesion to a coating comprising a curable resin such as a over coat paint, and therefore is useful.

The preparation of this aqueous dispersion composition can be conducted by, for example, a method of dissolving the epoxy group-containing compound (B) in an aqueous dispersion of the ionomer resin (A), a method of mixing an aqueous solution of the epoxy group-containing compound (B) with an aqueous dispersion of the ionomer resin (A), and a method of heat melting a mixture of the ionomer resin (A), the epoxy group-containing compound (B) and water and emulsifying in a batch manner. In particular, the method of dissolving the epoxy group-containing compound (B) in the aqueous dispersion of the ionomer resin (A), or that of mixing an aqueous solution of epoxy group-containing compound (B) with the aqueous dispersion of the ionomer resin (A) is preferable. Those methods are preferably conducted at a temperature of normal temperature to 180° C.

Concentration of the ionomer resin (A), the epoxy group-containing compound (B), and at least one kind selected from the reaction product (C) of the ionomer resin (A) and the epoxy group-containing compound (B), in the aqueous dispersion composition is not particularly be limited, and it can appropriately be adjusted according to the purpose of use, the method employed, the apparatus employed, and the like. For example, when the aqueous dispersion composition of the present invention is used as a rust-preventive treating agent, it is appropriately adjusted according to the coating method, the apparatus used for coating, and the like. The total amount of (A), (B) and (C) is generally 5–50% by weight, and preferably 10–40% by weight.

Further, in the aqueous dispersion composition of the present invention, the proportion of the ionomer resin (A), the epoxy group-containing compound (B), and at least one kind selected from the reaction product (C) of the ionomer resin (A) and the epoxy group-containing compound (B) is preferably the ratio of (A)/[(B)+(C)]=99/1 to 50/50, and particularly preferably (A)/[(B)+(C)]=90/10 to 60/40. When the aqueous dispersion composition of the present invention is used as a rust-preventive treating agent, if the proportion of the ionomer resin (A) exceeds the above-mentioned range, the obtained adhesion of the rust-preventive layer obtained to a over coat paint decreases, and on the other hand, if the proportion of the ionomer resin (A) is less than the above-mentioned range, corrosion resistance of the obtained rust-preventive layer lowers.

The aqueous dispersion composition of the present invention may contain, according to the need, other components, for example, various resins, compounding agents, and the like in addition to the above-mentioned ionomer resin (A), epoxy group-containing compound (B) and reaction product (C), within the range that the object of the present invention is not impaired. Examples of the other components include water-soluble amino resins, curing agents, organic thickeners, inorganic thickeners, surface active agents, water-soluble polyvalent metal salts, and other rust-preventive assistants, mildew proofing agents, ultraviolet absorbers, heat stabilizers, foaming agents, pigments, and fillers.

The water-soluble amino resin is used to improve strength of the coating, and examples thereof include water-soluble melamine resin, hexamethoxymelamine, methylolated benzoguanamine resins and methylolated urea resins. An example of the curing agent includes a phenolic resin. Further, the organic thickener or inorganic thickener is compounded in order to improve stability of the composition and to adjust the viscosity. Examples of the organic thickener include polyvinyl alcohol, polyvinyl pyrrolidone, polyvinyl methyl ether, polyethylene oxide, polyacryl amine, polyacrylic acid, carboxymethyl cellulose, methyl cellulose, and hydroxyethyl cellulose. Examples of the inorganic thickener include silicon dioxide, activated clay and bentonite.

The surface active agent is used to improve stability of the composition, and examples thereof include nonionic surface active agents, and anionic surface active agents. Further, examples of the pigment include titanium white, red iron oxide, phthalocyanine, carbon black and permanent yellow. Examples of the filler include calcium carbonate, magnesium carbonate, barium carbonate, talc, aluminum hydroxide, calcium sulfate, kaolin, mica, asbestos, and calcium silicate. Further, the rust-preventive assistant is used to improve rust-preventive ability of a coating formed of the aqueous dispersion composition of the present invention, and includes water-soluble polyvalent metal salts such as molybdate.

The aqueous dispersion composition of the present invention is particularly suitable as a rust-preventive treating agent for use in a rust-preventive treatment method in which the composition is applied to a metal surface to form a rust-preventive layer having excellent corrosion resistance and also good adhesion to a over coat paint.

When the aqueous dispersion composition of the present invention is used as a rust-preventive treating agent, addition of inorganic oxide colloid such as silica or titanium oxide, other than the above-mentioned ionomer resin (A), and epoxy group-containing compound (B), or reaction product (C), is effective to improve corrosion resistance. The blending ratio is the proportion of preferably 0–0.6, and more preferably 0.2–0.4, to [(A)+(B)+(C)]. If the blending ratio exceeds 0.6, adhesion between the rust-preventive layer obtained and a metal surface decreases, and further in the case of coating a over coat paint on an upper layer of the rust-preventive layer, adhesion between the rust-preventive layer and a metal surface and also adhesion between a coating of the over coat paint and the rust-preventive layer decrease, which is not preferable.

Examples of the metal plate to which the rust-preventive treatment method is applied include various metal plates such as zinc-plated steel plate, zinc-based alloy-plated steel plate, aluminum-plated steel plate, aluminum-based alloy-plated steel plate, cold rolled steel plate and hot rolled steel plate. Further, the rust treatment method of the present invention is also applicable to zinc plates, aluminum plates and the like. The metal plate applied may contain a slight amount of additional elements.

In the rust-preventive treatment method of the present invention, coating the rust-preventive treating agent can he conducted by any manner of spray, curtain, flow coater, roll coater, brush coating, dipping and the like. After coating the rust-preventive treating agent on a substrate, the agent may be spontaneously dried, but it is preferable to conduct baking. The baking temperature is 60–250° C., and by heating for 1–120 seconds, a rust-preventive layer comprising a coating having good corrosion resistance can be formed.

In the rust-preventive treatment method, the thickness of the rust-preventive layer formed on the substrate is appropriately selected according to the purpose of use of rust-preventive treated metal products, rust-preventive treating agent used, kind, thickness or the like of a over coat paint, and the like, and is not particularly limited thereto. Generally, in order to exhibit sufficient rust-preventive ability without causing breakage in the rust-preventive layer when drying after coating the rust-preventive treating agent, it is preferable to coat in a thickness of 0.1–20 $\mu$m, and it is particularly preferable to coat in a thickness of 0.3–10 $\mu$m.

In the rust-preventive treatment method of the present invention, the over coat paint coated on the rust-preventive layer formed with the treatment by the rust-preventive treating agent preferably is a paint comprising, for example, an acrylic resin, an acryl-modified alkyd resin, an epoxy resin, an urethane resin, a melamine resin, a phthalic acid resin, an amino resin, a polyester resin or a vinyl chloride resin. Of those, a paint comprising an urethane resin, a melamine resin or an acrylic resin is preferable because of particularly excellent adhesion to the rust-preventive layer comprising the rust-preventive treating agent of the present invention.

Further, this over coat paint may contain coloring pigments such as titanium white or carbon black, extenders such as talc, metal pigments such as aluminum powder or copper powder, and rust-preventive pigments such as red lead or lead sulfate, and the like. The paint may further contain dispersing agents, drying agents, plasticizers, defoaming agents, thickeners, stabilizers, anti-skinning agents, antimolds, antiseptic agents, antifreezing agents, and the like.

In the rust-preventive treated metal products produced by the rust-preventive treatment method of the present invention, the thickness of coating of the over coat paint is appropriately determined according to the purpose o0 use of the rust-preventive treated metal products, kind of the over coat paint used, and the like, and is not particularly limited thereto. Generally, it is about 5–300 $\mu$m, and particularly preferably 10–200 $\mu$m.

The formation of a coating of the over coat paint can be conducted by coating the over coat paint on the rust-preventive layer, drying under heating, and curing. The drying time and temperature are appropriately adjusted according to the kind of the over coat paint coated, the thickness of the coating, and the like. Generally, it is 5–120 minutes, and particularly about 20–80 minutes. In a normal temperature curable over coat paint, curing is completed in about one week. The drying temperature is generally in the range of normal temperature to 200° C., and in the range of particularly 50–150° C.

The rust-preventive treated metal products obtained by the rust-preventive treatment method of the present invention have a rust-preventive layer having excellent water resistance and rust-preventive property, and therefore can suitably be used as parts for automobiles, household appliances, building materials, or the like.

EXAMPLE

Hereinbelow, the present invention will be explained concretely in more detail by referring to the Examples and Comparative Examples, but the invention concerned is not limited to those Examples.

Evaluation Method (Preparation of Rust-preventive treated Metal Plate)

In Examples 1–3 and Comparative Example 1, a rust-preventive treating agent comprising an aqueous dispersion composition was coated on a zinc-plated steel plate, an iron-zinc alloy-plated steel plate, a zinc-55% aluminum-plated steel plate or a cold rolled steel plate in a dry coating thickness of 1 $\mu$m, and then baked under the conditions of 200° C. (plate-reaching temperature: 130° C.) and 45 seconds to obtain a rust-preventive treated metal plate sample.

Further, in Examples 4–5 and Comparative Examples 2–3, a melamine-alkyd resin paint (AMIRAK, a product of Kansai Paint Co.) was further coated on the rust-preventive treated metal plate sample obtained above by using a bar coater in a dry coating thickness of 3 $\mu$m, and then baked under the conditions of 200° C. (plate-reaching temperature: 130° C.) and 45 seconds to obtain a sample for evaluation of adhesion of a over coat paint.

(Emulsifying Property)

After producing an aqueous dispersion composition, it was filtered with a filter cloth of 100 mesh, and the amount of unemulsified product was measured. The rest was considered as an emulsified product, and a yield was determined, which was used as a measure of the emulsifying property.

(Coating Adhesion)

According to the method of a cross-cut adhesion test described in JIS K 5400, a test piece having formed thereon cross-cuts was prepared, and an adhesive tape (CELLOTAPE, trade name, a product of Nichiban Co.) was adhered on the cross-cuts of the test piece. Thereafter, the adhesive tape was peeled by promptly pulling in the direction of 90°, and the number of cross-cuts which were not peeled in 100 cross-cuts was counted. The value of (the number of cross-cuts not peeled)/100 was used as the measure of adhesion, and evaluation was made in the following criteria.

Adhesion between rust-preventive layer and metal surface:

⊚: 100/100–90/100

○: 80/100 or more and less than 90/100

Δ: 50/100 or more and less than 80/100

X: less than 50/100

Adhesion between rust-preventive layer and coating:

⊚: 100/100–90/100

○: 80/100 or more and less than 90/100

Δ: 50/100 or more and less than 80/100

X: less than 50/100

(Corrosion Resistance of Non-coated Rust-preventive Layer)

According to the salt spray test method described in JIS Z2371, 5% NaCl aqueous solution was sprayed to a non-coated rust-preventive treated metal plate sample at an atmosphere temperature of 35° C. Generation percentage of white rust after 240 hours was measured, and corrosion resistance was evaluated by the following criteria.

X: Generation percentage of white rust is 100–50%.

Δ: Generation percentage of white rust is 25% or more and less than 50%.

○: Generation percentage of white rust is 10% or more and less than 25%.

◎: Generation percentage of white rust is less than 10%.

Example 1

240 g of an ethylene-methacrylic acid copolymer neutralized with Mg (MFR (1900° C.): 0.6 g/10 min, methacrylic acid content: 15 wt %, degree of neutralization: 54%), 760 g of water and 18.8 g of potassium hydroxide (0.8 chemical equivalent to carboxyl groups of unneutralized ethylene-methacrylic acid copolymer) were introduced into a pressure autoclave having an inner volume of 1.5 liters. After raising the temperature to 170° C., the resulting mixture was stirred for 2 hours to obtain an aqueous dispersion composition. The aqueous dispersion composition obtained had a solid content concentration of 25.0, a viscosity of 125, a pH of 11.5 and 100 mesh on (residual percentage of sieve pass) of 0.02%. The yield of the aqueous dispersion was 97.2%. Using this aqueous dispersion composition as a rust-preventive treating agent, it was conducted evaluation of corrosion resistance of a non-coated rust-preventive layer and evaluation of adhesion between a rust-preventive layer and a metal surface. The results are shown in Table 1.

Example 2

250 g of an ethylene-methacrylic acid copolymer neutralized with Zn (MFR (190° C.): 0.7 g/10 min, methacrylic acid content: 15 wt %, degree of neutralization: 58%), 750 g of water and 22 g of potassium hydroxide (0.9 chemical equivalent to carboxyl groups of unneutralized ethylene-methacrylic aid copolymer) were introduced into a pressure autoclave having an inner volume of 1.5 liters. After rising the temperature to 170° C., the resulting mixture was stirred for 2 hours to obtain an aqueous dispersion composition. The aqueous dispersion composition obtained had a solid content concentration of 26.2, a viscosity of 123, a pH of 12.1 and 100 mesh on of 0.001%. The yield of the aqueous dispersion was 98.2%. Using this aqueous dispersion composition as a rust-preventive treating agent, it was conducted evaluation of corrosion resistance of a non-coated rust-preventive layer and evaluation of adhesion between a rust-preventive layer and a metal surface. The results are shown in Table 1.

Example 3

240 g of an ethylene-methacrylic acid copolymer neutralized with Mg (MFR (190° C.): 0.6 g/10 min, methacrylic acid content: 15 wt %, degree of neutralization: 54%), 760 g of water and 12.9 g of potassium hydroxide (0.55 chemical equivalent to carboxyl groups of unneutralized ethylene-methacrylic aid copolymer) were introduced into a pressure autoclave having an inner volume of 1.5 liters. After rising the temperature to 170° C., the resulting mixture was stirred for 2 hours to obtain an aqueous dispersion composition. The aqueous dispersion composition obtained had a solid content concentration of 13.0, a viscosity of 10, a pH of 11.8, and 100 mesh on of 27%. The yield of the aqueous dispersion was 69%. Using this aqueous dispersion composition as a rust-preventive treating agent, it was conducted evaluation of corrosion resistance of a non-coated rust-preventive layer and evaluation of adhesion between a rust-preventive layer and a metal surface. The results are shown in Table 1.

Comparative Example 1

275 g of an ethylene-methacrylic acid copolymer neutralized with Na (MFR (190° C.): 1.0 g/10 min, methacrylic acid content: 15 wt %, degree of neutralization: 55%), and 725 g of water were introduced into a pressure autoclave having an inner volume of 1.5 liters. After rising the temperature to 150° C., the resulting mixture was stirred for 2 hours to obtain an aqueous dispersion composition. The aqueous dispersion composition obtained had a solid content concentration of; 27.7, a viscosity of 515, a pH of 10.5 and 100 mesh on of 0.001%. The yield of the aqueous dispersion was 96.2%. Using this aqueous dispersion composition as a rust-preventive treating agent, it was conducted evaluation of corrosion resistance of a non-coated rust-preventive layer and evaluation of adhesion between a rust-preventive layer and a metal surface. The results are shown in Table 1.

Example 4

50% aqueous solution of tetraethylene glycol diglycidyl ether was prepared, and 2.5 g of this aqueous solution was added to 100 g of the aqueous dispersion composition obtained in Example 1, followed by stirring, thereby obtaining an aqueous dispersion composition. Using this aqueous dispersion composition as a rust-preventive treating agent, it was conducted evaluation of corrosion resistance of a non-coated rust-preventive layer and evaluation of adhesion between a rust-preventive layer and a coating and also between a rust-preventive layer and a metal surface. The results are shown in Table 1.

Example 5

An aqueous dispersion composition was produced in the same manner as in Example 4 except that the aqueous dispersion composition obtained in Example 2 was used in place of the aqueous dispersion composition obtained in Example 1. Using this aqueous dispersion composition as a rust-preventive treating agent, it was conducted evaluation of corrosion resistance of a non-coated rust-preventive layer and evaluation of adhesion between a rust-preventive layer and a coating and also between a rust-preventive layer and a metal surface. The results are shown in Table 1.

Comparative Example 2

An aqueous dispersion composition was produced in the same manner as in Example 4 except that the aqueous dispersion composition obtained in Comparative Example 1 was used. Using this aqueous dispersion composition as a rust-preventive treating agent, it was conducted evaluation of corrosion resistance of a non-coated rust-preventive layer and evaluation of adhesion between a rust-preventive layer and a coating and also between a rust-preventive layer and a metal surface. The results are shown in Table 1.

TABLE 1

| Metal Plate applied | Corrosion Resistance in Non-coated Test | Adhesion between Rust-preventive Layer and Coating | Adhesion between Rust-preventive Layer and Surface Metal |
|---|---|---|---|
| Example 1 | | | |
| Zinc-plated steel plate | ○ | X | ⊚ |
| Iron-zinc alloy-plated steel plate | ○ | X | ⊚ |
| Zinc-55% aluminum-plated steel plate | ⊚ | Δ | ⊚ |
| Cold rolled steel plate | ○ | X | ⊚ |
| Example 2 | | | |
| Zinc-plated steel plate | ○ | — | ⊚ |
| Iron-zinc alloy-plated steel plate | ○ | — | ⊚ |
| Zinc-55% aluminum-plated steel plate | ⊚ | — | ⊚ |
| Cold rolled steel plate | Δ | — | ⊚ |
| Example 3 | | | |
| Zinc-plated steel plate | ○ | — | ⊚ |
| Iron-zinc alloy-plated steel plate | ○ | — | ⊚ |
| Zinc-55% aluminum-plated steel plate | ⊚ | — | ⊚ |
| Cold rolled steel plate | Δ | — | ⊚ |
| Comparative Example 1 | | | |
| Zinc-plated steel plate | X | — | ⊚ |
| Iron-zinc alloy-plated steel plate | X | — | ⊚ |
| Zinc-55% aluminum-plated steel plate | X | — | ⊚ |
| Cold rolled steel plate | X | — | ⊚ |
| Example 4 | | | |
| Zinc-plated steel plate | ○ | ⊚ | ⊚ |
| Iron-zinc alloy-plated steel plate | ○ | ⊚ | ⊚ |
| Zinc-55% aluminum-plated steel plate | ○ | ⊚ | ⊚ |
| Cold rolled steel plate | ○ | ⊚ | ⊚ |
| Example 5 | | | |
| Zinc-plated steel plate | ○ | ⊚ | ⊚ |
| Iron-zinc alloy-plated steel plate | ○ | ⊚ | ⊚ |
| Zinc-55% aluminum-plated steel plate | ⊚ | ⊚ | ⊚ |
| Cold rolled steel plate | ○ | ⊚ | ⊚ |
| Comparative Example 2 | | | |
| Zinc-plated steel plate | X | ⊚ | ⊚ |
| Iron-zinc alloy-plated steel plate | X | ⊚ | ⊚ |
| Zinc-55% aluminum-plated steel plate | Δ | ⊚ | ⊚ |
| Cold rolled steel plate | X | ⊚ | ⊚ |

Comparing the results in Examples 1–3 and Comparative Example 1 shown in Table 1, it is understood that the rust-preventive treating agent of the present invention containing an aqueous dispersion of an ionomer neutralized with Zn or Mg forms a rust-preventive layer having excellent corrosion resistance as compared with the rust-preventive treating agent of Comparative Example 1 containing an aqueous dispersion of an ionomer neutralized with Na.

Further, comparing the results in Examples 4 and 5 and comparative Example 2 shown in Table 1, it is understood that by using an epoxy group-containing compound together, the rust-preventive treating agent of the present invention containing an aqueous dispersion of an ionomer neutralized with Zn or Mg maintains its excellent corrosion resistance, and also adhesion between a rust-preventive layer and a coating of a over coat paint increases.

Example 6

A rust-preventive treating agent comprising an aqueous dispersion composition was prepared by further adding silica colloid (trade name: SNOWTEX N, a product of Nissan Chemical Industries, Ltd.) to the aqueous dispersion composition obtained in Example 1 in the solid content weight ratio of silica colloid/aqueous dispersion shown in Table 2. This rust-preventive treating agent was coated on a zinc-plated steel plate to form a sample having a rust-preventive layer with a thickness of 1 μm. Evaluation of corrosion resistance of a non-coated rust-preventive layer and evaluation of adhesion between a rust-preventive layer and a metal surface were made on this sample. The results are shown in Table 2.

TABLE 2

| | Ratio of Silica Colloid/ Aqueous Dispersion | Generation Percentage after Salt Spray Test (%) | Adhesion between Rust-preventive Layer and Metal Surface |
|---|---|---|---|
| Example 6 | 0 | ○ | ⊚ |
| | 0.05 | ○ | ⊚ |
| | 0.1 | ○ | ⊚ |
| | 0.2 | ⊚ | ⊚ |
| | 0.4 | ⊚ | ⊚ |
| | 0.6 | ⊚ | ○ |
| | 0.7 | ⊚ | Δ |
| | 1.0 | ⊚ | X |

From the results of Example 6 shown in Table 2, it is understood that corrosion resistance is further improved by adding silica colloid. Further, it is understood that if the solid weight ratio of silica colloid/aqueous dispersion exceeds 0.6, adhesion between a rust-preventive layer and a metal surface decreases.

Industrial Applicability

The aqueous dispersion composition of the present invention sufficiently answers high degree of the required performances, and in particular, is suitable as a heat sealing agent for aluminum foil, film, paper or the like, a metal coating agent, various emulsion modifiers, a paint, an adhesive, a rust-preventive treating agent, and the like.

Also, according to the production process of the aqueous dispersion composition of the present invention, the above-mentioned aqueous dispersion can be produced in high yield.

Further, the rust-preventive treating agent of the present invention can form a rust-preventive layer having excellent corrosion resistance and also showing excellent adhesion to a over coat paint when the over coat paint is coated on its upper layer. For this reason, the rust-preventive treating agent of the present invention is suitable as a rust-preventive treating agent for a zinc-plated steel plate, a zinc-based alloy-plated steel plate, an aluminum-plated steel plate, an aluminum-based alloy-plated steel plate, a cold rolled steel plate, a hot rolled steel plate, an aluminum plate, an aluminum alloy plate, and the like.

Furthermore, according to the rust-preventive treatment method of the present invention, a rust-preventive layer having excellent corrosion resistance and also excellent adhesion to a over coat paint can be formed on the surface of metal products.

Further, the rust-preventive treated metal product of the present invention has a rust-preventive layer comprising the above-mentioned rust-preventive treating agent on its surface, thus showing excellent corrosion resistance, and also shows excellent painting adhesion to a over coat paint.

What is claimed is:

1. An aqueous dispersion composition comprising:
   (A) an ionomer resin neutralized with at least one divalent metal selected from the group consisting of Mg and Zn,
   (B) at least one epoxy group-containing compound,
   (C) a reaction product of the (A) ionomer resin and the epoxy group-containing compound, wherein components (A), (B) and (C) are present in the proportion of (A)/((B)+(C))=99/10 to 50/50, and
   (D) water.

2. A process for producing an aqueous dispersion composition comprising a step of mixing:
   (A) an ionomer resin neutralized with at least one divalent metal selected from the group consisting of Mg and Zn,
   (B) at least one an epoxy group-containing compound,
   (C) a reaction product of (A) the ionomer resin and (B) the epoxy group-containing compound, wherein components (A), (B) and (C) are present in the proportion of (A)/((B)+(C))=99/10 to 50/50, and
   (D) a monovalent alkali metal compound to emulsify said aqueous dispersion.

3. A rust-preventive treating agent for a metal surface, comprising an aqueous dispersion of:
   (A) an ionomer resin neutralized with at least one divalent metal selected from the group consisting of Mg and Zn,
   (B) a least one epoxy group-containing compound, and
   (C) a reaction product of (A) the ionomer resin and (B) the epoxy group-containing compound, wherein components (A), (B) and (C) are present in the proportion of (A)/((B)+(C))=99/1 to 50/50,
   wherein said rust-preventative treating agent for a metal surface prevents rust.

4. A rust-preventive treatment method, which comprises the steps of:
   coating a rust-preventive treating agent onto a metal surface to form a rust-preventive layer, said rust-preventive treating agent for a metal surface comprising an aqueous dispersion of:
   (A) an ionomer resin neutralized with at least one divalent metal selected from the group consisting of Mg and Zn,
   (B) ac least one epoxy group-containing compound, and
   (C) a reaction product of (A) the ionomer resin and (B) the epoxy group-containing compound, wherein components (A), (B) and (C). are present in the proportion of (A)/((B)+(C))=99/1 to 50/50.

5. A rust-preventive treatment method, which comprises the steps of:
   (i) coating a rust-preventive treating agent onto a metal surface to form a rust-preventive layer, said rust-preventive treating agent for a metal surface comprising an aqueous dispersion of:
   (A) an ionomer resin neutralized with at least one divalent metal selected from the group consisting of Mg and Zn,
   (D) at least one epoxy group-containing compound, and
   (E) a reaction product of (A) the ionomer resin and (B) the epoxy group-containing compound, wherein components (A), (B) and (C) are present in the proportion of (A)/((B)+(C))=99/1 to 50/50, and
   (ii) applying an overcoat paint on the rust-preventative layer to form a coating.

6. A rust-preventive treated metal product obtained by the steps of:
   coating a rust-preventive treating agent onto a metal surface to form a rust-preventive layer, said rust-preventive treating agent for a metal surface comprising an aqueous dispersion of:
   (A) an ionomer resin neutralized with at least one divalent metal selected from the group consisting of Mg and Zn,
   (F) at least one epoxy group-containing compound, and
   (G) a reaction product of (A) the ionomer resin and (B) the epoxy group-containing compound, wherein components (A), (B) and (C) are present in the proportion of (A)/((B)+(C))=99/1 to 50/50.

7. The rust-preventive treated metal product as claimed in claim 6, wherein said metal product comprises a zinc-plated steel plate, a zinc-based alloy-plated steel plate, an aluminum-plated steel plate, a cold rolled steel plate, an aluminum plate, or an aluminum alloy plate.

* * * * *